July 27, 1954

F. BACKMAN 2,684,598

VARIABLE SPEED DRIVE

Filed Feb. 10, 1950

Fred Backman
INVENTOR.

BY *Clarence A. O'Brien
and Harvey B. Jackson*
Attorneys

Patented July 27, 1954

2,684,598

UNITED STATES PATENT OFFICE 2,684,598

VARIABLE SPEED DRIVE

Fred Backman, Washougal, Wash., assignor of forty per cent to James R. Johnson, Camas, Wash.

Application February 10, 1950, Serial No. 143,588

1 Claim. (Cl. 74—230.17)

This invention relates to improvements in drive apparatus or mechanisms.

An object of this invention is to drive a machine element at various rates of speed through a drive mechanism which includes four pulleys, each of which is of the expansible type, two pulleys being connected together by means of a belt and the other two pulleys being connected together by means of a belt and by virtue of spreading the various pulley elements in a number of arrangements, impart motion to a drive belt which connects with the machine element to be operated.

Ancillary objects and features will become apparent in following the description of the illustrated form of the invention.

Figure 1:
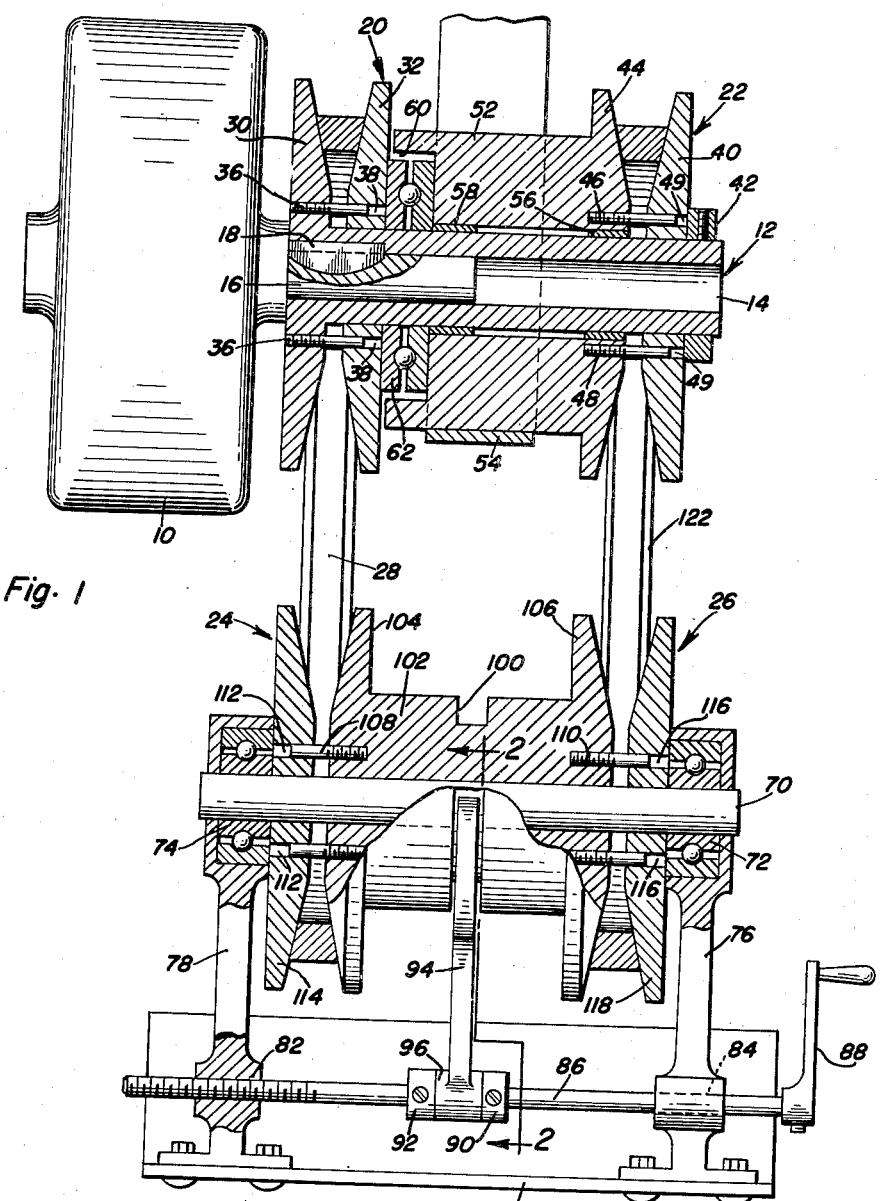
Figure 1 is a sectional view of the device, portions being shown in elevation.
Figure 2:
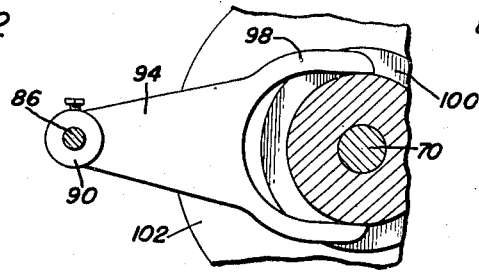
Figure 2 is a sectional vew taken substantially on the line 2—2 of Figure 1 and in the direction of the arrows.

A motor 10 is supplied with a motor shaft 12 and includes a hollow shaft or sleeve 14 disposed on the motor shaft 16 and connected therewith by means of a woodruff key 18 or other type of key.

A first pulley 20, a second pulley 22, a third pulley 24 and a fourth pulley 26 are employed in the structure. Each pulley is of the expansible type consisting of a pair of elements.

The pulley 20 has beveled inner faces to accommodate the V-belt 28 with the pulley 24. Each of the pulleys has beveled inner faces.

A pulley element 30 forms a part of the pulley 20 and has a companion element 32 in confronting relation therewith. Pins 36 are fixed, as by a threaded connection with the pulley element 30 and slide in passages 38 formed in the companion element 32. This allows the companion element to slide inwardly and outwardly with respect to the companion element 30, which is formed integrally or fixed rigid with the hollow shaft 14.

Reference is now made to the second pulley 22 wherein the pulley element 40 is mounted for rotation on the shaft 12 and is limited in its axial movement with respect to the shaft 14 by means of the adjustable collar 42, which is disposed on the shaft 12. The companion pulley element 44 has pins 46 and 48 threaded therein which are slidably disposed in the bores 49 in said element 40. Accordingly the element 40 is slidable inwardly and outwardly with respect to the element 44.

Formed integrally or rigidly fixed to the companion element 44 is a drive member 52 which is in the form of a drum or another V-grooved pulley of the rigid type. The belt 54 is disposed on the drive member 52 and is adapted to connect with a machine element for the actuation thereof.

Babbitt bearings 56 and 58 are disposed on the hollow shaft 14 and form a seat for the drive member 52. These babbitt bearings may be discarded in favor of bearings of other types, depending upon the size and specifications of the job to be performed by the mechanism.

A recess 60 is formed in one end of the drive member 52 in order to form a pocket for the thrust bearing 62. This thrust bearing is shiftably mounted on the hollow shaft 14 and is of the conventional anti-friction type with two races; one race engaging the drive member 52 and the other race engaging the pulley element 32 of the first pulley 20.

A shaft 70 is mounted in anti-friction bearings 72 and 74 which are carried by the supports 76 and 78. These supports are disposed on a suitable bracket 80 which may be mounted in any convenient location in the shop or in any other place where the device is employed. A threaded passage 82 is formed in one of the supports and another passage 84 is formed in the other support in order to accommodate the jack shaft or jack screw 86. This jack screw has a handle 88 at one end thereof for manual operation. Intermediate the ends of this jack shaft there are a pair of collars 90 and 92 which are held in place by means of set screws thereby rendering them adjustable. A yoke 94 has a bearing 96 at one end which is disposed on the jack shaft 86 between the bearings 90 and 92 and has bifurcations 98 at the other end which are disposed in the channel 100.

Said channel is formed in a member 102 which has companion pulley elements 104 and 106 formed at each end thereof. The companion element 104 forms a part of the third pulley 24 and the companion element 106 forms a part of the fourth pulley 26.

Said member 102 is disposed on the shaft 70 and has two sets of pins 108 and 110 projecting from opposite ends thereof. The pins 108 are disposed in bores 112 of the pulley element 114 which is companion to the element 104 in order to form said third pulley 24. The pins 110 are disposed in bores or passages 116 which are formed in the companion element 118, said last named element forming a part of the pulley 26.

The V-belt 122 is entrained around the pulley 26 and also the pulley 22, thereby connecting the second and fourth pulleys.

In operation the motor 10 is rendered operative, after the drive member 54 is connected with the machine element which is to be operated. This renders the pulley 20 operative and through the belt 28, the third and fourth pulleys, the belt 22 and finally the second pulley, the drive member 52 and hence the belt 54 is operated.

The handle 88 is manipulated in order to shift the member 102 in one direction or the other, as for example in such direction as to cause the effective diameter of the fourth pulley 26 to become larger than the effective diameter of the third pulley. This will happen simultaneously inasmuch as the companion elements 102 and 106 are fixed with the member 102.

An increase in the effective diameter of the pulley 20 is occasioned by virtue of the fact that the third pulley has been made larger by the shifting of the yoke 94 thereby pulling the belt 122 downwardly causing the pulley 22 to become of a smaller effective diameter, thus shifting the thrust bearing 62 in order to squeeze the companion elements 30 and 32 together.

The reverse operation takes place in so far as adjustment when the handle 88 is rotated in the opposite direction. The first and fourth pulleys are caused to become smaller in effective diameter with an inverse change in effective diameter of the second pulley 22 and third pulley 24.

Having described the invention, what is claimed as new is:

In combination with a motor having a drive shaft, a variable speed drive apparatus comprising first and second drive pulleys spaced from one another, the first pulley being mounted for rotation with said drive shaft and the second pulley being mounted for rotation on said drive shaft, each of said pulleys including a pair of cone shaped disks movable toward and away from one another, a hub between said drive pulleys connected to one cone disk of said second pulley and constituting a driving member for driving a mechanism from the apparatus, a base remote from said drive shaft, a countershaft rotatably mounted on said base parallel to said drive shaft, first and second driven pulleys spaced along said countershaft and mounted thereon in respective alignment with said first and second drive pulleys, belts entrained over each pair of aligned pulleys, said driven pulleys comprising outer cone-shaped disks and an elongated hub having cone-shaped ends spacing said disks from one another, said hub being axially slidable along said countershaft to vary the effective diameter of said driven pulleys, said hub being further provided with an annular groove intermediate its ends, means seating in said groove and operable from said base for axially sliding said hub along said countershaft, said means including a fork having its tines seating in said groove, said base having aligned transverse bores therethrough, an axially movable crank rod extending loosely through one of said bores and threaded through the other of said bores and rotatably and non-slidingly carrying said fork.

References Cited in the file of this patent

UNITED STATES PATENTS

| Number | Name | Date |
| --- | --- | --- |
| 1,854,018 | Carlberg | Apr. 12, 1932 |
| 2,251,488 | Hucke | Aug. 5, 1941 |
| 2,351,148 | Rafter | June 13, 1944 |
| 2,464,841 | Alexander | Mar. 22, 1949 |
| 2,557,849 | Victory | June 19, 1951 |

FOREIGN PATENTS

| Number | Country | Date |
| --- | --- | --- |
| 464,331 | Great Britain | Apr. 12, 1937 |
| 630,556 | Great Britain | Oct. 17, 1949 |
| 818,014 | France | Sept. 17, 1937 |